Nov. 26, 1968    A. R. KULL ET AL    3,412,595

STOCK TRANSFER MECHANISM

Filed Oct. 21, 1965    6 Sheets-Sheet 1

INVENTORS
ALBERT R. KULL
WARNER C. LOGAN

BY *Oberlin, Maky & Donnelly*

ATTORNEYS

Nov. 26, 1968   A. R. KULL ET AL   3,412,595

STOCK TRANSFER MECHANISM

Filed Oct. 21, 1965   6 Sheets-Sheet 2

INVENTORS
ALBERT R. KULL
WARNER C. LOGAN

BY Oberlin, Maky & Donnelly
ATTORNEYS

United States Patent Office 3,412,595
Patented Nov. 26, 1968

3,412,595
STOCK TRANSFER MECHANISM
Albert R. Kull, Beachwood, and Warner C. Logan, Timberlake, Ohio, assignors to The Ajax Manufacturing Company, Euclid, Ohio, a corporation of Ohio
Filed Oct. 21, 1965, Ser. No. 499,758
14 Claims. (Cl. 72—405)

ABSTRACT OF THE DISCLOSURE

A stock transfer mechanism for forging machines including opposed vertically movable slides each mounted on opposed horizontally movable slides, each horizontally movable slide being driven by a piston-cylinder assembly through a pressure differential device, the transfer mechanism including turn-grip segments journalled for rotation substantially about the center of the stock with pawl means being operative to rotate the segments as the supporting slide moves up and down.

---

This invention relates generally as indicated to a stock transfer mechanism and more particularly to a transfer mechanism for forging machines operative to shift elongated blanks from one position to another in a forging machine for the sequential performance of forging operations thereon.

In an upsetting forging machine the elongated blanks or stock are shifted from one set of die cavities to another for a series of upsetting operations thereon in a particular desired sequence. It is, of course, much more efficient in the case of an automatic machine to provide stock transfer means which will also be fully automatic in operation and such automatic transfer mechanisms may be seen, for example, in Leinweber Patent No. 2,796,616 and Kull Patent No. 3,149,353, both assigned to The Ajax Manufacturing Company of Euclid, Ohio. The machine illustrated in the aforementioned Leinweber patent as illustrative of a transfer means adapted to rotate the stock about its axis to a desired degree while transferring stock to a subsequent work station. This is accomplished by positively rolling the workpiece along a guideway to a new position. While the transfer mechanism of the Leinweber patent has been found to be highly successful in the production of relatively small items such as bolts, it is difficult to utilize such mechanism for the accurate sizing of larger stock as, for example, torsion bars. In automotive production, torsion bars require a precisely dimensioned hexagonal head which will fit closely within the gripping socket in the assembly. Moreover, such bars may be of substantial size and length. Needless to say, it is a substantial problem automatically to transfer torsion bar stock through an automatic forging machine for the formation of the hex head and the proper sizing thereof.

It is accordingly a principal object of the present invention to provide an automatic stock transfer mechanism which will feed elongated blanks through a forging machine first without rotating such stock to form the hex head thereon, and then to rotate such stock precisely about its axis for subsequent work stations precisely to size the thus formed head.

Another main object is the provision of a stock transfer mechanism which will rotate the stock about its axis through a predetermined limited arc while transferring such stock between certain work stations.

A further object is the provision of an automatic stock transfer mechanism for an automatic forging machine of a simplified nature which will solve the above-noted problems, and accomplish the above-noted objects.

Yet another object is the provision of an automatic transfer mechanism which can readily be attached to or installed on existing forging machines.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however of but one of the various ways in which the principles of the invention may be employed.

THE FORGING MACHINE

Figure 1:
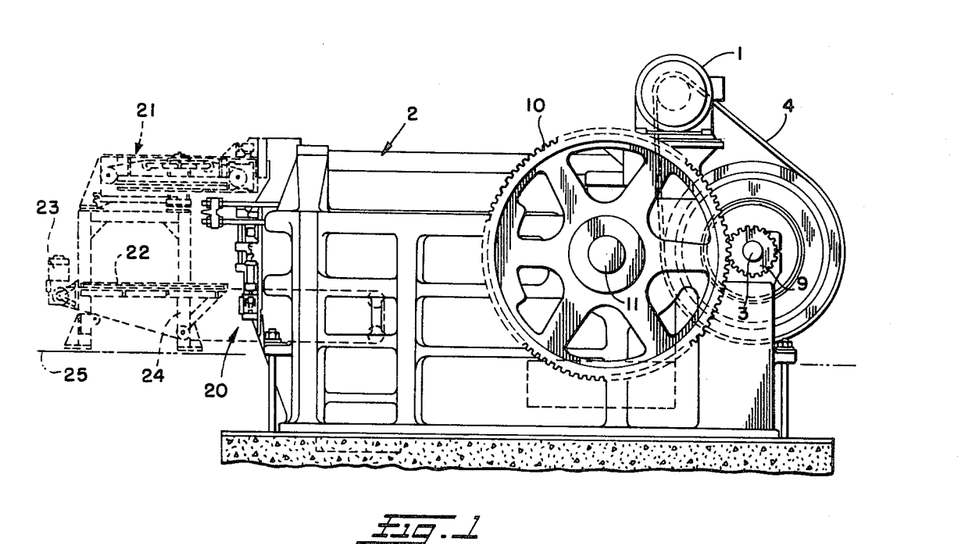
FIG. 1 is a side elevation illustrating an automatic forging machine with the stock transfer mechanism of the present invention mounted thereon and with a suitable stock feed mechanism shown in phantom lines.
Figure 2:
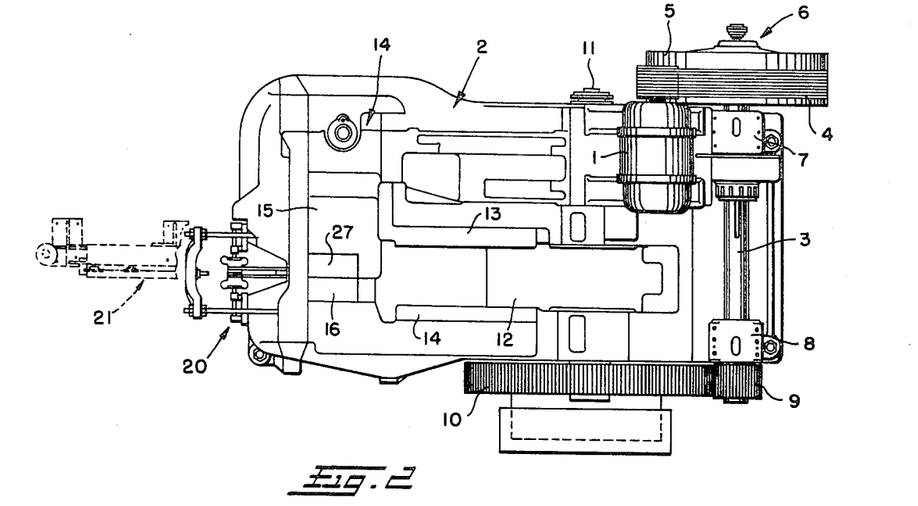
FIG. 2 is a top plan view of the machine shown in FIG. 1.

Referring now to FIGS. 1 and 2, there is illustrated the present invention in combination with a four inch Ajax forging machine of a well-known type. Such machine includes a main drive motor 1 which is mounted on top of main frame 2, a large casting, and drives backshaft 3 through belt transmission 4, flywheel 5 and air-operated clutch 6. The backshaft 3 is journalled in the frame at 7 and 8, and on the opposite end is provided with a pinion 9 in mesh with much larger bull gear 10 mounted on the main crankshaft 11.

The crankshaft is, of course, operative to reciprocate the header slide 12 in ways 13 and 14, as well as to reciprocate die slide 15 toward and away from fixed die 16, through a knuckle linkage indicated generally at 17. The tooling carried by the die slide 15 thus cooperates with the fixed die 16 to grip the elongated blanks fed downwardly through the machine while reciprocation of the header slide 12 carries suitable tooling hereinafter described for performing the various forging operations on the end of the workpiece at the stations wherein the workpiece is sequentially positioned by the stock transfer mechanism.

The stock transfer mechanism is shown generally at 20 in FIGS. 1 and 2, and is mounted on the front of the machine to feed the stock downwardly sequentially through the gripping dies. A stock feed mechanism 21 shown in phantom lines and the subject of applicants' copending application entitled "Stock Feed Mechanism," Ser. No. 499,921, filed even date herewith, is operative to feed the blanks or stock to a position to be gripped by a transfer mechanism 20 to be fed downwardly through the machine for the performance of the forging operations thereon, and then to be discharged onto stock discharge conveyor 22 for removal from the machine. The discharge conveyor may be of the silent chain type driven by motor 23 and is mounted on the framing 24 supporting the stock feed mechanism 21 mounted on the floor 25. It can thus be seen that the foundation 26 of the forging machine may be substantially beneath the floor line 25.

Figure 3:
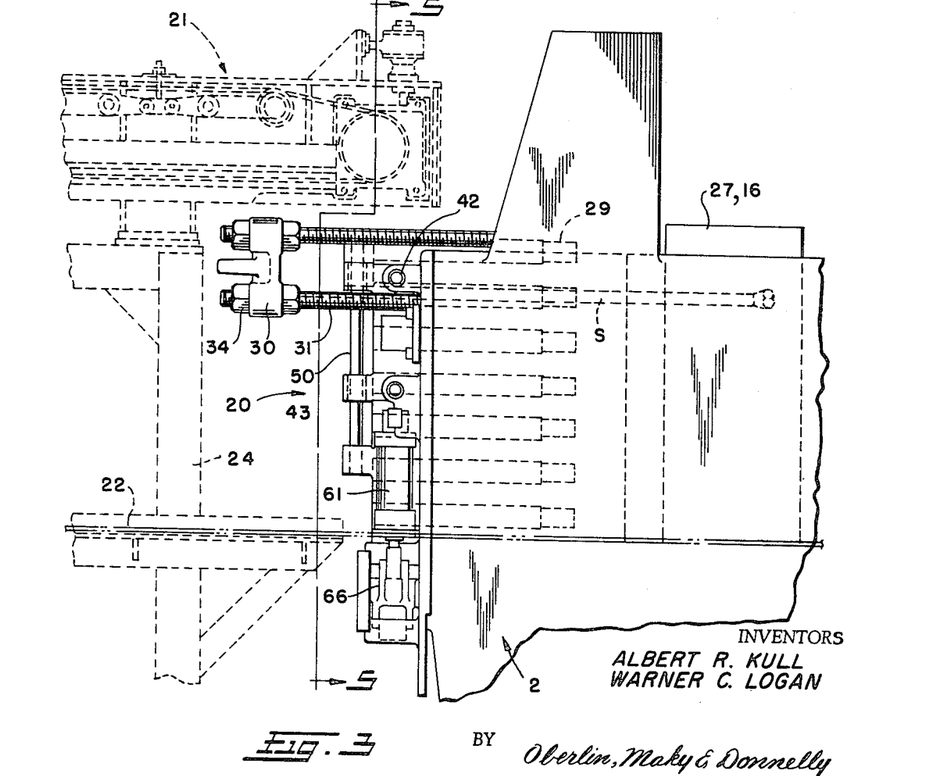
FIG. 3 is an enlarged fragmentary side elevation of the stock transfer mechanism again with the stock feed mechanism shown in phantom lines.
Figure 4:
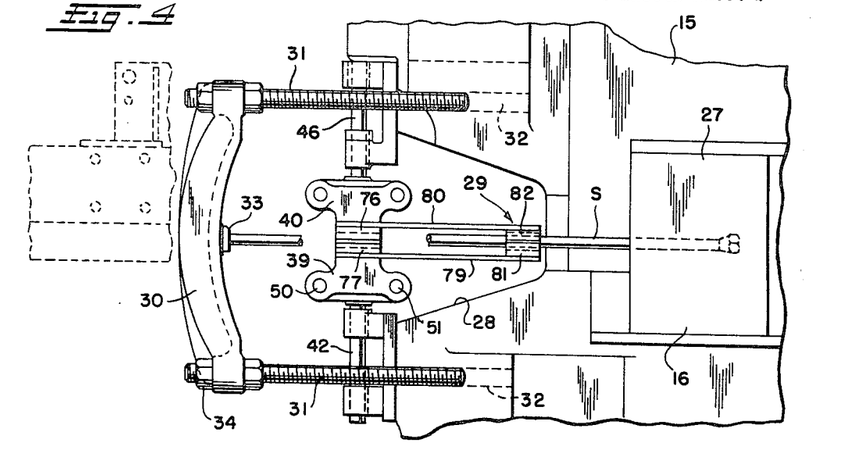
FIG. 4 is a fragmentary top plan view of the mechanism as shown in FIG. 3.

Referring now to FIGS. 3 and 4, the stationary gripping die 16 is seen as opposed to the movable gripping die 27 carried by the die slide 15. The front of the press or bed frame 2 is provided with a recess 28 which accommodates the gripping fingers 29 of the stock transfer mechanism 20 for movement of the stock S downwardly through the throat of the machine. A backstop 30 is provided for the first cone position and is mounted on the front of the press by means of four studs 31 which are threaded into tapped openings 32. The backstop 30 contains a backstop pad 33 operative to engage the back end of the stock S in the cone position and, of course, the backstop may be adjusted by means of the nuts 34.

THE STOCK, TRANSFER, MECHANISM

Figure 5:
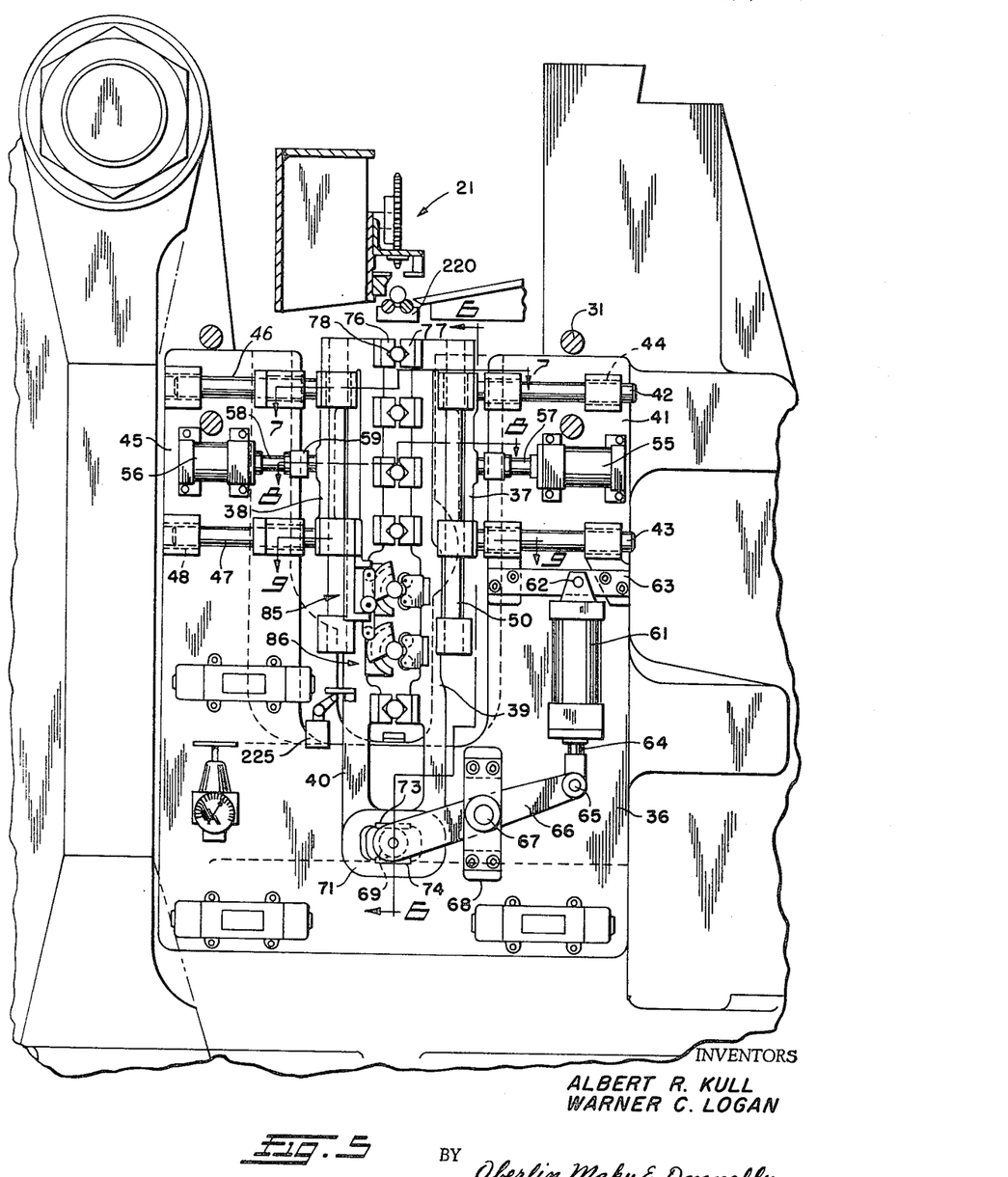
FIG. 5 is an enlarged vertical section taken substantially on the line 5—5 of FIG. 3 illustrating the transfer mechanism in elevation with the forging machine broken away and the stock gripping fingers closed and down.

Referring now additionally to FIGS. 5 through 9, it will be seen that the stock transfer mechanism is supported on a U-shape mounting plate 36 which may be bolted to the front of the bed frame 2, and consists basically of four moving members; right and left horizontal slides 37 and 38, respectively, and right and left vertical slides 39 and 40. The right hand horizontal slide 37 as viewed in FIG. 5 is attached to the upper leg 41 of the plate 36 for horizontal sliding movement by means of guide rods 42 and 43, each slide guided in a pair of aligned bushings as shown at 44. The same is true for the left hand horizontal slide 38 as seen in FIG. 5, being mounted on the leg 45 of the plate 36 by means of rods 46 and 47 guided in aligned bushings 48. The configuration of the vertical slides 39 and 40 is shown more clearly in FIG. 6 and they are attached to the respective horizontal slides by means of a pair of sliding rods 50 and 51 which are slide guided in bushings 52 in lateral projections 53 at the top and bottom of the horizontal slides 37 and 38.

Movement of the horizontal slides is obtained by opposed pneumatic cylinder assemblies 55 and 56 mounted on the upwardly projecting legs 41 and 45 of the plate 36. The rods 57 and 58 of such assemblies are threadedly connected to stops 59 provided with studs in turn threadedly secured to the slides by means of the tapped apertures 60 therein seen more clearly in FIG. 8.

Vertical movement of the slides 39 and 40 on the horizontal slides 37 and 38 is obtained by pneumatic piston cylinder assembly 61 seen in FIG. 5, the blind end of which is pivoted at 62 to the bracket 63 secured to the leg 41 of the plate 36 while the rod 64 is pivotally connected at 65 to lever 66. The lever 66 is centrally pivoted at 67 to bracket 68 secured to the frame 36 and is provided with a roll pin 69 at the opposite end thereof. The ends of the lever 66 may be bifurcated at opposite ends to accommodate the pin connections 65 and 69.

Figures 6, 7, 8, 9, 11, 12:
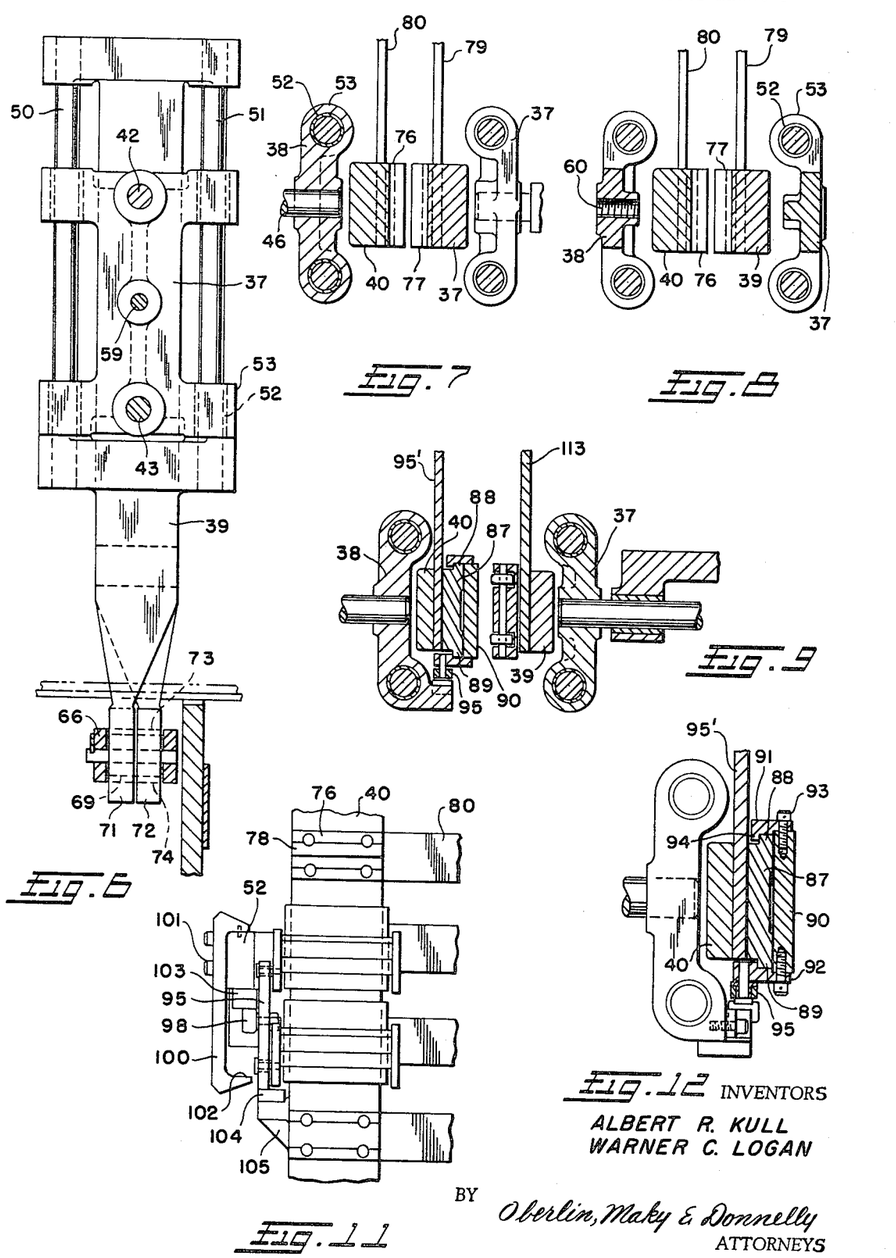
FIG. 6 is an enlarged fragmentary vertical section of the transfer mechanism taken substantially on the line 6—6 of FIG. 5 with the fingers up.
FIG. 7 is an enlarged fragmentary horizontal section taken substantially on the line 7—7 of FIG. 5.
FIG. 8 is a similar horizontal section taken substantially on the line 8—8 of FIG. 5.
FIG. 9 is a similar horizontal section taken on the line 9—9 of FIG. 5.
FIG. 11 is a fragmentary vertical section of such portion of the transfer mechanism taken substantially on the line 11—11 of FIG. 10 on a somewhat reduced scale.
FIG. 12 is a fragmentary horizontal section taken substantially on the line 12—12 of FIG. 10.
Figure 10:
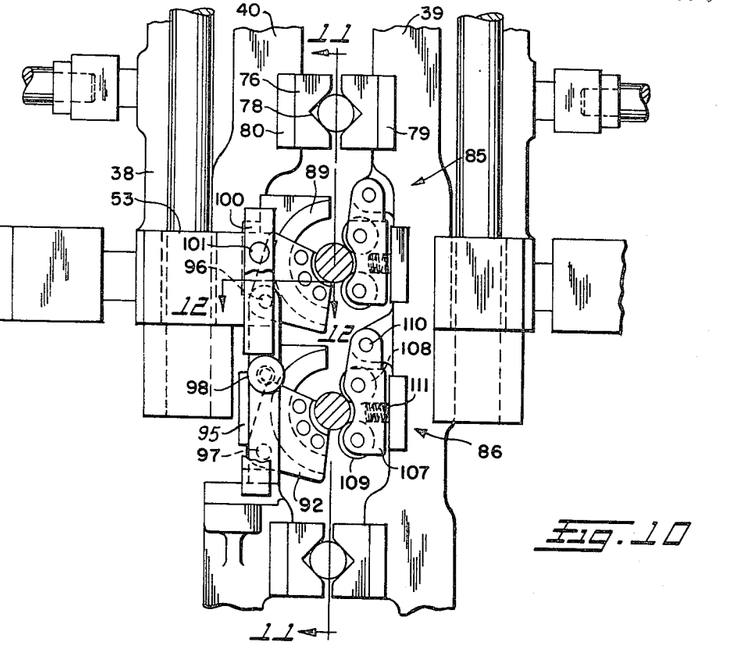
FIG. 10 is an enlarged end elevation of that portion of the transfer mechanism which rotates the workpieces between the sizing operations.

The lower ends of the vertical slides 39 and 40 are offset as indicated in FIG. 6, and provided with inwardly projecting rectangular frame yokes 71 and 72 which are horizontally aligned. Such yokes are provided with top and bottom rails as seen at 73 and 74 confining the pin 69 therebetween. It can now be seen that extension of the piston cylinder assembly 61 will cause the lever 66 to rock about its central pivot 67 raising the vertical slides 39 and 40 which are guided in such movement by movement of the rods 50 and 51 through the guide bushings 52 in the laterally projecting portions 53 of the horizontal slides 37 and 38. The pivot connection provided by the pin 69 and the yokes 71 and 72 also permits the vertical slides to reciprocate horizontally when the piston cylinder assemblies 55 and 56 move the horizontal slides 37 and 38. It is here noted that the vertical slides are shown in their lowermost position in FIG. 5 and in their uppermost position in FIG. 6.

It is, of course, the vertical slides 39 and 40 which carry the stock gripping fingers 29, and it will be seen that the top four sets of such fingers as well as the bottom set are identical. Each of these identical sets comprises a first pair of opposed gripping members 76 and 77 which are provided with opposed V-shape recesses 78. Such gripping members are mounted on rearwardly extending rectangular bars 79 and 80 which are in turn secured to the vertical slides 39 and 40. At the rearward end of such bars similar stock gripping members 81 and 82 are provided also with opposed V-shape recesses so that the stock which may be of substantial length will be firmly gripped at substantially longitudinally spaced positions.

STOCK ROTATING FINGERS

Referring now to FIGS. 9, 10, 11 and 12 in addition to FIG. 5, it will be seen that the stock gripping fingers which are in the fifth and sixth position reading from the top in FIG. 5 which transfer the stock between the fourth and fifth, and the fifth and sixth die station, respectively, are adapted to rotates the stock 60° precisely to permit the alternate sizing of all sides of the hex head being formed by the closing operation of the gripping dies 27 and 16. The turn-grip fingers are shown generally at 85 and 86.

The left hand side of the turn-grip fingers as seen in FIG. 9 each comprise an arcuate bearing lock 87 of bronze or hardened steel, for example, which include laterally projecting arcuate flanges or guides 88 and 89. Grip segments 90 are provided with pie-shape end retainers 91 and 92 secured to the grip segments by the fasteners 93 shown in FIG. 12, for example. Such end retainers include inwardly projecting flanges as shown at 94 projecting behind the arcuate flanges of the bearing blocks 87, and it will be seen that the parts are machined so that the grip segments will freely rotate around the center of the stock at these stations. The bearing blocks 87 are, of course, mounted on the rearwardly extending rectangular bars 95' which in turn are mounted on the vertical slide 40. Such bars extend inwardly toward the gripping dies.

On the outboard side the pie-shape end retainers for the two stations are interconnected by a link 95. Such link is pivoted at 96 and 97 to the two vertically spaced end retainers, respectively. An outwardly projecting cam roller 98 is mounted on the link. As seen in FIG. 11, a C-shape stop member 100 is secured by fasteners 101 to the lowermost lateral projection 53 of the left hand horizontal slide 38 as viewed in FIG. 10. The lower end of the stop member 100 thus provides a lower stop surface 102, and a stop block 103 may be secured beneath the projection 52. Accordingly, as the vertical slide 40 moves up and down the cam roller 98 will engage alternatively the stops 102 and 103 causing the link 95 vertically to shift which in turn causes the turn-grip segments to rotate in unison. A stop block 104 is mounted on projection 105 of the vertical slide 40 and limits the lowermost position of the link 95 with respect to the slide properly to position the arcuate or alternatively notched faces of the grip segments in a position to receive the stock as the vertical slides move upwardly.

The opposite or right hand side of each of the turn-grip fingers is comprised of blocks 107 having journalled therein vertically spaced pairs of rollers 108 and 109. Such blocks may be pivoted at 110 and spring 111 produce sufficient force to enable the stock to be gripped while the rollers permit the stock to rotate freely. The springs extend between the blocks and the rectangular bars 113 opposed to the bars 95' as seen in FIG. 9 which extends toward the rear of the machine, and both such bars at the rear may be provided with roller type units as seen on the right hand side of FIG. 10. Thus the turn-grip segments may be provided only on the left hand side of the front set of gripping fingers for both of the finger sets 85 and 86.

Figure 13:
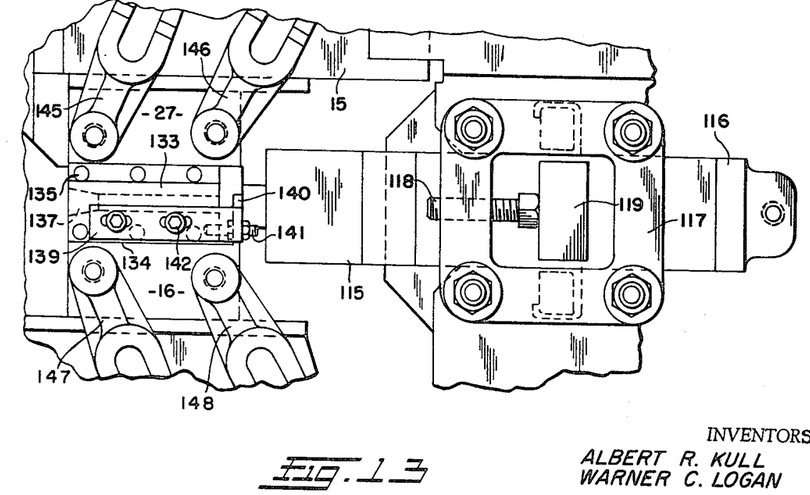
FIG. 13 is a fragmentary top plan view of the tool holder illustrating the position of the stock gauge.
Figure 14:
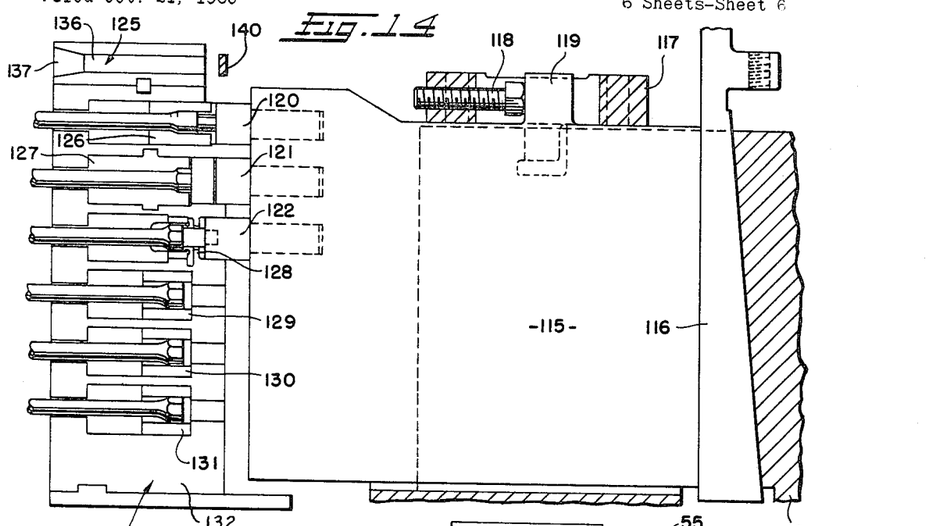
FIG. 14 is a fragmentary vertical section illustrating the tool and die arrangement for the illustrated forging machine.

Referring now to FIGS. 13 and 14, it will be seen that the header slide 12 is provided with a tool holder 115 which may be held in place in conventional manner by wedge 116 as well as the bridging clamp 117 having screw 118 therein bearing against projection 119 on the top of the tool holder. The tools secured to the tool holder 115 may include a first cone tool 120, an upset or forge hex tool 121 and a punch 122 operative to trim the flash produced by the forge hex tool 121 thereabove.

As illustrated by the open face of the movable gripping die block 27 in FIG. 14, such gripping dies may include reading from top to bottom a load station 125, first cone tooling 126, forge hex tooling 127, a trim die 128 through which the work is driven by the trim punch 122, and three successive sizing dies 129, 130 and 131. The bottom of the gripping die blocks may be recessed as indicated at 132 so that finished work will simply drop onto the discharge conveyor 22 directly therebeneath. The load station 125 of the tooling may be comprised of two upwardly extending projections or blocks 133 and 134 mounted on the top of the gripping die blocks 27 and 16, respectively, by suitable fasteners as indicated at 135. It will, of course, be understood that such upwardly projecting blocks have mating longitudinal recesses 136 therein having a flared mouth 137. On the projection 134 on the top of the stationary gripping die block 16 there is provided an adjustable bracket 139 which includes on the inner end a downwardly and inwardly projecting stop gauge plate 140. The position of the stop guage plate 140 with respect to the tooling may be adjusted by screw 141, and the bracket may be firmly clamped in position by the screws 142 accommodated in elongated slots. The die 27 may be held to the die slide 15 by suitable die clamps 145 and 146 while the stationary die 16 may be held to the machine frame by die clamps 147 and 148, as seen in FIG. 13.

CONTROL DIAGRAM

Figure 15:
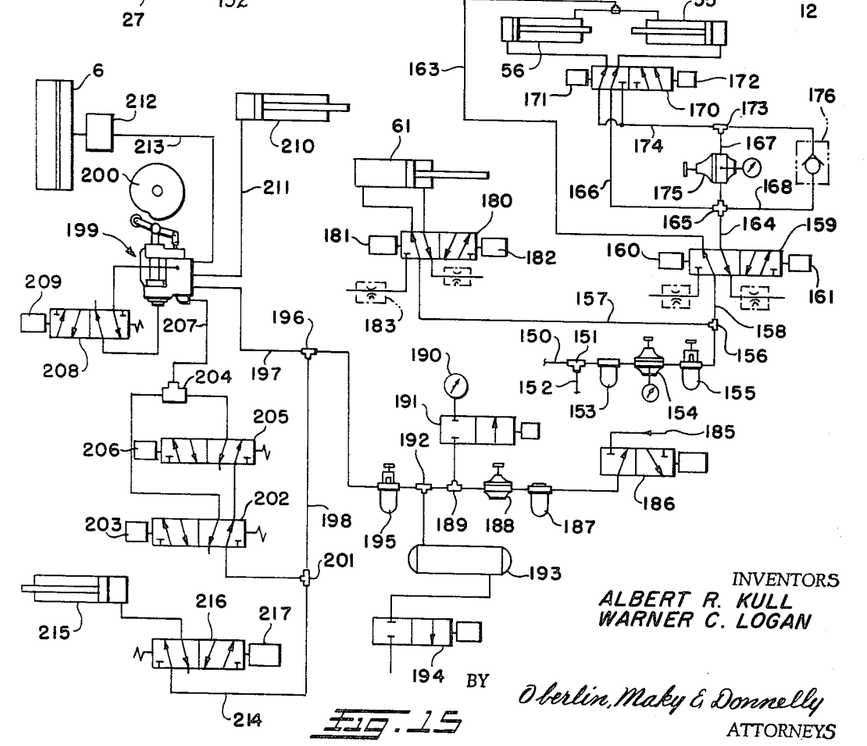
FIG. 15 is a schematic pneumatic diagram of a portion of the pneumatic controls for the machine.

Referring now to FIG. 15, it will be seen that the control components of the present invention may be operated from a one-half inch air line source 150 through T 151 providing a branch 152 leading to the control components of the feed mechanism 21 which are described in more detail in the above-mentioned copending application. From the T 151 the air then moves through a filter 153, a regulator 154 and a lubricator 155 to a T 156. The regulator 154 may have a range of from 0 to 125 p.s.i. and is set, for example, at about 85 p.s.i. From the T 156 the air then branches into lines 157 and 158. The line 158 leads to two solenoid, four-way valve 159 operated by a "fingers open" solenoid 160, and a "fingers closed" solenoid 161. When the fingers open solenoid 160 is energized, the air will then flow from the line 158 to line 163 to the rod ends of the horizontal slide cylinders 56 and 55 causing the fingers to separate. When the "fingers closed" solenoid 161 is energized, air is supplied from the line 158 to line 164 which is connected to four-way union 165 distributing the air to lines 166, 167 and 168. The line 166 is connected directly to a two solenoid four-way two pressure valve 170 operated by a "fingers out" selenoid 171 and a "fingers in" solenoid 172. The line 167 is reconnected to the line 168 by T 173 and such lines are connected to two ports of the valve 170 by the line 174. In lines 167 and 168 are a self-relieving regulator 175 and a check-valve 176, respectively. The regulator 175 may have a range of from 0 to 125 p.s.i., but, contrary to the setting of the regulator 154, may preferably be set at about 40 p.s.i. It may here be recalled that the regulator 154 was set at about 85 p.s.i. Thus air may be supplied to the valve 170 at the one port through line 166 at about 85 p.s.i. while at two ports through line 174 at about 40 p.s.i. The terms "fingers in" and "fingers out" designates that transfer operation when the blanks are transferred out of the stationary die 16 and after vertically moved then transferred into the stationary die.

For vertical movement of the fingers the line 157 is connected to two solenoid four-way valve 180 controlled by "fingers up" solenoid 181 and "fingers down" solenoid 182. As indicated, the valves 180 and 159 are provided with variable orifice metering valves as shown at 183 in the discharge lines connected to the ports thereof.

The control components of the machine itself may be operated by air pressure from a somewhat larger one inch air supply line 185 through exhaust lock-out valve 186 and through filter 187 and regulator 188 to T 189. The T 189 provides a connection to air gauge 190 through air cock 191. Another T 192 is connected to surge tank 193 which may be drained through air cock 194. Air lubricator 195 is then provided and then a T 196 providing branches 197 and 198. The line 197 leads to a timer valve 199 which may be similar to that illustrated in Patent No. 2,850,132 to John J. Elliot assigned to The Ajax Manufacturing Company of Euclid, Ohio. The valve 199 may be operated inter alia by cam 200 which may be mounted on the crankshaft to sense a complete stroke of the press. The line 198 leads to a T 201 and the branch formed thereby leads to a single solenoid four-way spring return valve 202, which may be operated by "by-pass" solenoid 203 to supply air to the opposite sides of directional valve 204 either directly, or through single solenoid four-way spring return valve 205 which is operated by "brake and clutch" solenoid 206. From the directional valve 204 the air then passes to the timer valve 199 through line 207.

Single solenoid four-way spring return valve 208 may be operated by "single cycle" solenoid 209. The timer valve 199 in turn operates brake cylinder 210 through line 211 which functions to stop the whole machine in the event of a shutdown and such timer valve also operates clutch 6 through rotary distributor 212 in line 213. From the T 201 line 214 leads to flywheel brake cylinder 215 through single solenoid four-way spring return valve 216 which is operated by "flywheel brake" solenoid 218. It is here noted that the machine controls which are illustrated as operated from the source 185 may be generally conventional and may be operated to perform a cycle manually or set up so that the cycle will be repeated automatically for a complete automatic operation.

OPERATION

Heated stock from a furnace, not shown, may be received by the feed mechanism 21 in feed trough 220 shown in FIG. 5, the bed of which is aligned with the load station 125, and pushed longitudinally against the stock gauge plate 140 and held in such position. The stock is now in position to be gripped by the uppermost set of transfer fingers to be transferred sequentially downwardly through the tooling of the machine for the performance of the forging and sizing operations thereon.

When the header slide 12 starts its backward motion, the transfer fingers have reached the up position and have closed on the stock in the load or feed and gauge station. As the grip dies open (by movement of the movable gripping die 27 away from the stationary gripping die 16) the transfer fingers while closed upon the stock move the stock horizontally outwardly away from the stationary gripping die and then move vertically downwardly to the point where the stock is then parallel to the first die station as shown by the tools 120 and 126 in FIG. 14. As the header slide begins its forward stroke, the fingers then move the stock into the first die station and hold it there until the dies close and grip the stock. The fingers now open horizontally, i.e., separate, and then move vertically up to the feed and gauge station for the next piece of stock. A complete cycle of the operation of the transfer fingers may then be characterized as follows: (with the fingers in the up position) fingers close; transfer out; down; transfer in; fingers open; up; and fingers close.

The various horizontal movements are, of course, obtained by using two pneumatic pressures supplied by the regulators 154 and 175, respectively, and applying these pressures selectively to the cylinder assemblies 55 and 56 with the two solenoid valves 159 and 170. As seen in FIG. 15, to close the fingers, high pressure is applied on the left cylinder 56 at the blind end and low pressure on the right cylinder 55 at the blind end. To transfer out, low pressure is applied on the left hand cylinder at the blind end and high pressure is applied on the right hand cylinder also at the blind end. The cylinder 55 will then overcome the cylinder 56 moving the transfer fingers in unison toward the left or away from the stationary gripping die. The fingers are then moved downwardly in unison by the actuation of the solenoid 182 to apply pressure to the rod end of the cylinder 61 to retract the same and to transfer in or toward the stationary gripping die at the now lower station, high pressure is applied to the left hand cylinder 56 at the blind end and low pressure to the right hand cylinder 55 at the blind end. The higher pressure in the cylinder 56 then overcomes the lower pressure behind the piston of the cylinder 55. To open the fingers high pressure is, of course, applied to both cylinders at the rod end through the line 163 and when open, the solenoid 181 will be actuated to supply the air through line 157 to the blind end of cylinder 61 extending the same. When the fingers are in their up position and opened, they will then be closed upon the stock by applying high pressure to the blind end of the cylinder 56 and low pressure to the blind end of cylinder 55 as aforesaid.

It is noted that the vertical motion is obtained by moving the two vertical slides 39 and 40 up and down with the air cylinder 61 and the various horizontal positions relative to each other are accommodated by the employment of the elongated frame or yoke assembly at the bottom of each slide with the vertical force being imparted through the lever 66 and the roller assembly within each yoke.

It can now be seen that the stock is moved downwardly by the gripping fingers when the horizontal slides are in a transfer out position and the stock is clear of the cavities in the stationary gripping die. In the turn-grip stations 85 and 86, downward movement of the fingers in the closed position will cause the camroller 98 to engage the vertically fixed lower stop 102 causing the stock S to be rotated precisely 60° between the fourth and fifth, and the fifth and sixth die stations. This permits alternate sizing on all sides of the hex head being forged. As the stock moves downwardly, it will then be rotated in a clockwise direction as viewed in FIG. 10 to be moved into the stationary gripping die in such thus rotated position. When the fingers open after the stock has been gripped by the movable gripping die 27, the upward movement of the fingers will cause the cam roller 98 to engage the top stop 103 to be repositioned by rotation of the revolvable gripping fingers in such stations 60° in a counterclockwise direction as viewed in FIG. 10.

In the illustrated embodiment the transfer finger arrangement is designed so that the machine can accommodate stock sizes ranging from about three-sixteenths of an inch in diameter to about one and three-sixteenths inch in diameter, and such sizes can be transferred and rotated without installing different grip blocks or turn-grip segments for each size. To convert the stock transfer mechanism to stock diameters in excess of the above range, spacer blocks or shims may be changed.

All the horizontal and vertical movements of the fingers and the high and low speed movements of the feed mechanism 21 may be timed by means of a ten station cam limit switch chain driven by the crankshaft of the forging machine. The transfer fingers are interlocked with the forging machine by limit switch 225 mounted on the mounting plate 36 of the transfer assembly as well as one of the cam limit switch stations. If both limit switches are not tripped at the same time, due to jamming or loss of air pressure, the entire forging machine will stop. The switch 225 is positioned to signal the full down and in position of the transfer mechanism as indicated in FIG. 5.

It can now be seen that there is provided a transfer mechanism for an automatic forging machine which will move relatively large diameter stock downwardly through the machine and between certain stations rotate the stock about its axis to permit alternate sizing of the sides of the hex head being forged. Moreover, the various horizontal movement of the stock gripping fingers can be obtained simply by using two pneumatic pressures and applying these selectively by means of the valves illustrated. It is moreover apparent that the stock transfer mechanism can be applied to existing forging machines with very slight modification.

Other modes of applying the principles of the invention may be employed, change being made as regards the details described, provided the features stated in any of the following claims or the equivalent of such be employed.

We, therefore, particularly point out and distinctly claim as our invention:

1. In an upsetting forging machine having a stationary gripping die, a horizontally reciprocable gripping die adapted to be reciprocated into and out of work gripping relation to said stationary die, and a third die horizontally reciprocable in a direction normal to such reciprocation of said reciprocable gripping die to engage and upset an end portion of a workpiece thus gripped by said gripping dies; stock transfer means for gripping such work alternately with said gripping dies and moving the same sequentialy downwardly therethrough. said stock transfer means comprising opposed movable slides having opposed pairs of stock gripping fingers thereon, means to move said slides in unison horizontally with respect to each other to open and close said fingers and in unison horizontally to move the stock gripped thereby to and from said stationary gripping die, means vertically to move said slides in unison upwardly with the fingers open and downwardly with the fingers closed, and means operative to rotate the stock held by only certain of said fingers through a pre-determined arc in response to such vertical downward movement, wherein said means to move said slides horizontally comprises a pair of horizontal slides carrying said opposed movable slides, and respective fluid pressure means operative to move said horizontal slides.

2. A forging machine as set forth in claim 1 including first and second pressure means, and means operative to apply said first and second pressure means selectively to said respective fluid pressure means to move said slides horizontally while maintaining stock gripping pressure.

3. A forging machine as set forth in claim 2 wherein said respective fluid pressure means comprise opposed pneumatic piston cylinder assemblies, and wherein said means to apply said first and second pressures thereto comprise a two pressure valve connected to the blind ends of said assemblies, and a single pressure valve connected to the rod ends of said assemblies, and to said two pressure valve.

4. A forging machine as set forth in claim 3 including a pressure regulator between said single pressure valve and said two pressure valve and connected to certain ports of said two pressure valve.

5. A forging machine as set forth in claim 1 including turn-grip segments on at least two vertically spaced stock gripping fingers, said turn-grip segments being opposed by spring-loaded roller finger assemblies, and stop and pawl means operative to rotate said turn-grip segments through such pre-determined arc and thus the work held thereby in response to vertical movement of said fingers.

6. A forging machine as set forth in claim 5 including a link interconnecting said vertically spaced turn-grip segments, said pawl means being mounted on said link, said stop means comprising vertically spaced abutments operative to engage said pawl means to rotate said turn-grip segments in one direction on downward movement of said fingers and to ensure reverse rotation on upward movement.

7. Stock transfer means for a forging machine and the like of the type having a reciprocating header die and relatively movable gripping dies comprising opposed slide means mounted for movement parallel to the parting line of such gripping dies, sets of opposed stock gripping fingers on said opposed slide means operative to grip stock therebetween, further slide means supporting said opposed slide means for movement normal to the parting line of such gripping dies, and differential fluid pressure means connected to said further slide means operative to move said opposed slide means supported thereby to open and close said opposed fingers as well as to move said fingers while closed toward and away from such stationary gripping die.

8. A stock transfer mechanism as set forth in claim 7 wherein said opposed slides include aligned yokes, a roller assembly mounted within said yokes, a lever connected to said roller assembly, and pneumatic piston cylinder means connected to said lever operative to move said opposed slides parallel to the parting line of such gripping dies.

9. A stock transfer mechanism as set forth in claim 8 wherein said yoke and roller assembly is elongated to accommodate movement of said opposed slides relative to each other, and toward and away from such stationary gripping die.

10. Stock transfer means as set forth in claim 7 wherein said differential fluid pressure means comprises opposed piston cylinder assemblies connected to said further slide means, and valve means operative to supply fluid at one pressure to one assembly and at a reduced pressure to the other assembly to move said fingers closed in one direction and vice versa to move said fingers closed in the opposite direction.

11. Stock transfer means as set forth in claim 10 wherein such fluid at such two pressures is supplied to said assemblies by means of a four-way two pressure valve.

12. Stock transfer means as set forth in claim 10 wherein said opposed piston cylinder assemblies have their rods directed toward each other, and means to supply fluid at high pressure simultaneously to the rod ends of said assemblies to open said fingers.

13. Stock transfer means for a forging machine and the like of the type having a reciprocating header die and relatively movable gripping dies comprising opposed slide means mounted for movement parallel and normal to the parting line of such gripping dies, sets of opposed stock gripping fingers on said opposed slide means, at least one of said sets of fingers comprising on one side a turn-grip segment and on the opposite side a roller assembly cooperating therewith to hold stock therebetween when said fingers are closed, means responsive to movement of said slide means parallel to such parting line to turn said segment through a predetermined arc thus to rotate such stock about its axis, said turn-grip segment being mounted on an arcuate bearing block the center of which is substantially the center of such stock, pawl means connected to said segment, and stop means operative to engage said pawl means and rotate said segment when said slide means is moved parallel to such parting line.

14. Stock transfer means as set forth in claim 13 wherein two adjacent sets of fingers are provided with said turn-grip segments, link means interconnecting said segments for rotational movement in unison, said pawl means being mounted on said link means.

References Cited

UNITED STATES PATENTS

| | | | |
|---|---|---|---|
| 2,052,760 | 9/1936 | Friedman | 72—421 |
| 2,074,104 | 3/1937 | Criley | 10—12 |
| 2,835,152 | 5/1958 | Lamprecht | 72—405 |
| 2,856,802 | 10/1958 | Hercik | 10—12 |
| 2,997,725 | 8/1961 | Friedman | 10—12 |
| 3,007,181 | 10/1961 | Felber | 10—12 |
| 3,183,532 | 5/1965 | Kull | 10—12 |

CHARLES W. LANHAM, *Primary Examiner.*

E. SUTTON, *Assistant Examiner.*